United States Patent
Sugiyama

(10) Patent No.: US 9,405,496 B2
(45) Date of Patent: Aug. 2, 2016

(54) IMAGE FORMING APPARATUS, IMAGE FORMING METHOD AND STORAGE MEDIUM

(75) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 702 days.

(21) Appl. No.: 12/727,410

(22) Filed: Mar. 19, 2010

(65) Prior Publication Data

US 2010/0271652 A1    Oct. 28, 2010

(30) Foreign Application Priority Data

Apr. 27, 2009 (JP) ................. 2009-107978

(51) Int. Cl.
*G06F 3/12* (2006.01)
*G06K 15/00* (2006.01)
*H04N 1/40* (2006.01)
*H04N 1/04* (2006.01)

(52) U.S. Cl.
CPC .......... *G06F 3/1285* (2013.01); *G06F 3/1213* (2013.01); *G06F 3/1256* (2013.01); *G06F 3/1263* (2013.01); *G06F 3/1219* (2013.01)

(58) Field of Classification Search
CPC ............... H04N 1/00238; H04N 2202/0081; H04N 1/0082; H04N 2202/0086
USPC ............ 358/1.15, 3.21, 1.13, 434, 1.11; 347/171, 188
See application file for complete search history.

(56) References Cited

U.S. PATENT DOCUMENTS

| | | | | |
|---|---|---|---|---|
| 4,054,948 A * | 10/1977 | Grier | ............ | B41B 27/36 345/168 |
| 4,110,795 A * | 8/1978 | Spencer | ............ | 382/239 |
| 5,208,902 A * | 5/1993 | Kumon | ............ | G06K 15/00 355/102 |
| 5,557,312 A * | 9/1996 | Sago | ............ | 347/171 |
| 5,581,669 A * | 12/1996 | Voth | ............ | G06F 13/385 358/1.14 |
| 5,754,744 A * | 5/1998 | Matsumoto | ............ | G06F 3/1297 358/1.13 |
| 6,067,645 A * | 5/2000 | Yamamoto et al. | ............ | 714/57 |
| 6,075,928 A * | 6/2000 | Kitada | ............ | H04N 1/32502 358/1.13 |
| 6,122,073 A * | 9/2000 | Miyasaka et al. | ............ | 358/434 |
| 6,373,582 B1 * | 4/2002 | Asai | ............ | H04N 1/00238 358/1.13 |

(Continued)

FOREIGN PATENT DOCUMENTS

| | | |
|---|---|---|
| JP | 08-084213 | 3/1996 |
| JP | 08-111727 | 4/1996 |

(Continued)

OTHER PUBLICATIONS

Japanese Official Action dated Mar. 10, 2011 together with an English language translation from JP 2009-107978.

(Continued)

*Primary Examiner* — Akwasi M Sarpong
(74) *Attorney, Agent, or Firm* — Scully, Scott, Murphy & Presser, P.C.

(57) ABSTRACT

An image forming apparatus comprises a print section, an accepting section for accepting a print request, and a control section which causes the print section to execute printing on the basis of a print request accepted by the accepting section and judges whether or not the image forming apparatus is busy when a print request is accepted by the accepting section. When the control section judges that the image forming apparatus is busy, the control section prohibits an execution of at least a part of printing based on a print request.

14 Claims, 11 Drawing Sheets

(56) References Cited

U.S. PATENT DOCUMENTS

| | | | |
|---|---|---|---|
| 6,437,869 B1* | 8/2002 | Matoba | G06F 3/1207 358/1.11 |
| 6,631,432 B1* | 10/2003 | Yamagishi | 710/107 |
| 6,864,992 B1* | 3/2005 | Okada | G06F 11/3409 358/1.13 |
| 6,909,520 B2* | 6/2005 | Ogino | G06F 3/1204 358/1.13 |
| 6,965,462 B1* | 11/2005 | Henderson | H04N 1/40006 358/3.21 |
| 7,248,385 B2* | 7/2007 | Murakami | G06F 3/1213 358/1.12 |
| 7,937,586 B2* | 5/2011 | Torre | G06F 21/445 713/168 |
| 8,073,251 B2* | 12/2011 | Matsuoka | G06K 9/00442 358/1.9 |
| 2002/0035935 A1* | 3/2002 | Kaneda | B41C 1/14 101/128.4 |
| 2002/0054320 A1* | 5/2002 | Ogino | G06F 3/1204 358/1.15 |
| 2008/0106758 A1* | 5/2008 | Kazume | G06F 3/1204 358/1.15 |
| 2009/0103141 A1* | 4/2009 | Kuznetsov | H04N 1/4092 358/3.21 |
| 2011/0161119 A1* | 6/2011 | Collins | 705/4 |

FOREIGN PATENT DOCUMENTS

| | | |
|---|---|---|
| JP | 11-020271 | 1/1999 |
| JP | 11-110156 | 4/1999 |
| JP | 11-203089 A | 7/1999 |
| JP | 2000-194524 | 7/2000 |
| JP | 2001-005629 | 1/2001 |
| JP | 2001-191552 A | 7/2001 |
| JP | 2002-347231 A | 12/2002 |
| JP | 2004-009368 | 1/2004 |
| JP | 2004-178019 | 6/2004 |
| JP | 2008-119833 | 5/2008 |

OTHER PUBLICATIONS

Japanese Official Action dated Aug. 9, 2011 from related Japanese Application No. 2009-107978, together with an English-language translation.

* cited by examiner

FIG. 3

| TIME ZONE | BUSYNESS DEGREE |
|---|---|
| 0:00~1:00 | LOW |
| 1:00~2:00 | LOW |

⋮

| 9:00~10:00 | LOW |
|---|---|
| 10:00~11:00 | HIGH |
| 11:00~12:00 | HIGH |
| 12:00~13:00 | LOW |
| 13:00~14:00 | HIGH |
| 14:00~15:00 | LOW |
| 15:00~16:00 | HIGH |
| 16:00~17:00 | LOW |

⋮

| 22:00~23:00 | LOW |
|---|---|
| 23:00~0:00 | LOW |

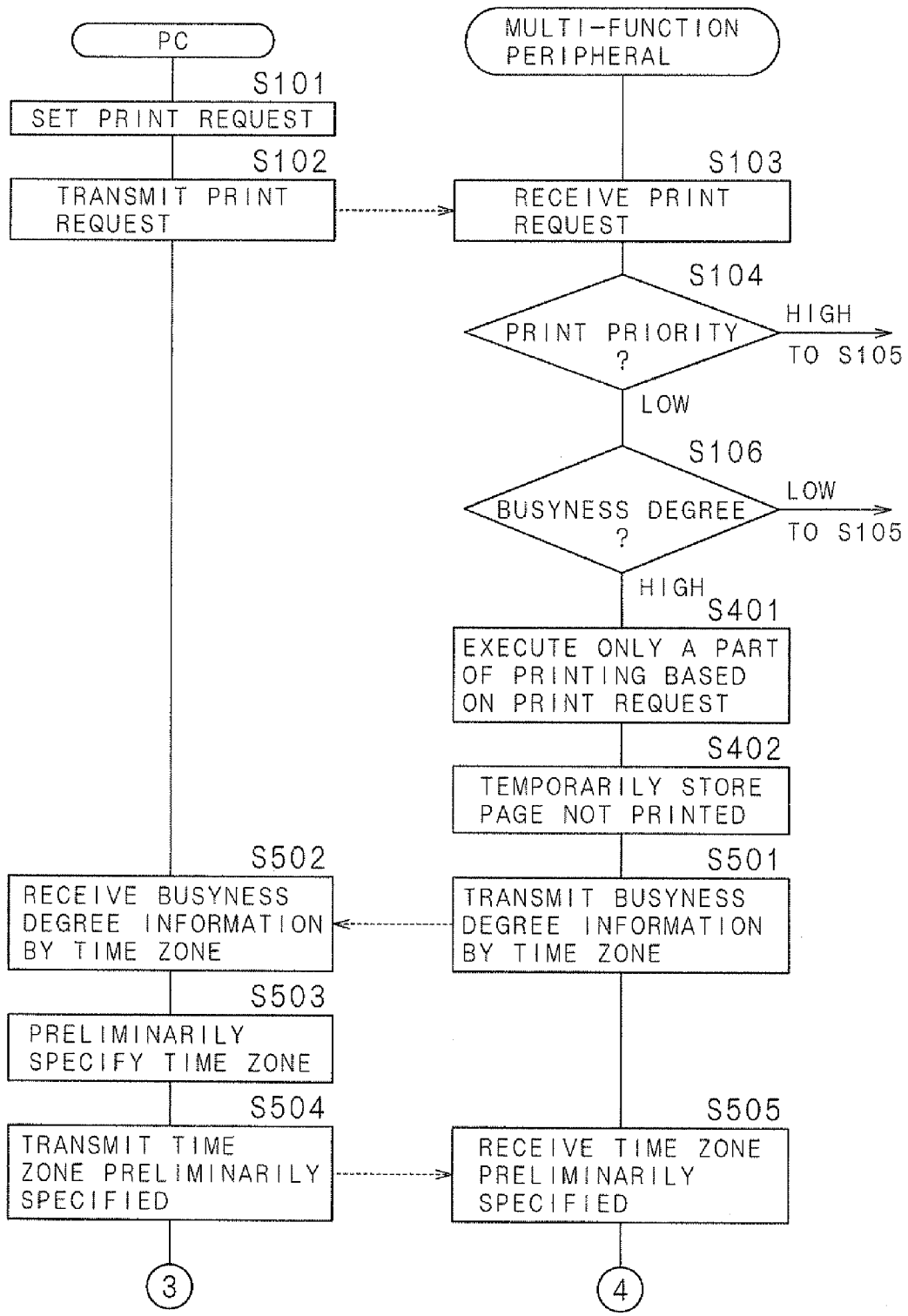

IMAGE FORMING APPARATUS, IMAGE FORMING METHOD AND STORAGE MEDIUM

CROSS-REFERENCE TO RELATED APPLICATIONS

This non-provisional application claims priority under 35 U.S.C. §119(a) on Patent Application No. 2009-107978 filed in Japan on Apr. 27, 2009, the entire contents of which are hereby incorporated by reference.

TECHNICAL FIELD

The present invention relates to an image forming apparatus, an image forming method and a storage medium in which a print control program is stored.

BACKGROUND

Conventionally, a printer driver program is known which automatically judges whether data with a large load is printed and prompts the user to check whether data desired to be printed is correct, thereby preventing wasteful printing (for example, refer to Japanese Patent Application Laid-Open No. 11-203089 (1999)). For example, when only one page out of a plurality of pages is desired to be printed, such a printer driver can prevent that all the pages are printed due to an operation error, thereby preventing wasteful printing and waiting for printing for a long time.

SUMMARY

However, with the conventional printer driver program, when the amount of data desired to be printed is enormous and the user judges that the data is correct, a multi-function peripheral is occupied for a long time for the purpose of printing the enormous amount of the data, and there is a possibility of causing inconvenience to other users.

Under the above-mentioned circumferences, the present invention has been accomplished, and an object of the present invention is to provide an image forming apparatus, an image forming method and a storage medium in which a print control program is stored, capable of reducing print wait times for other users.

An image forming apparatus according to a first aspect is an image forming apparatus, comprising: a print section; an accepting section for accepting a print request; and a control section which causes said print section to execute printing based on said print request accepted by said accepting section; and judges whether or not the image forming apparatus is busy when said print request is accepted by said accepting section, wherein said control section prohibits an execution of at least a part of the printing based on said print request when said control section judges that the image forming apparatus is busy.

According to the first aspect, when the image forming apparatus is busy, an execution of at least a part of printing based on a print request is prohibited, whereby a print wait time for other user can be reduced.

An image forming method according to a second aspect is an image forming method using an image forming apparatus including a print section, comprising: a acceptance step of accepting a print request; a control step of causing said print section to execute printing based on said print request accepted at said acceptance step; and a busyness degree judgment step of judging whether or not said image forming apparatus is busy when said print request is accepted at said acceptance step, wherein an execution of at least a part of printing based on said print request is prohibited at said control step when the image forming apparatus is judged to be busy at said busyness degree judgment step.

According to the second aspect, when the image forming apparatus is busy, an execution of at least a part of printing based on a print request is prohibited, whereby a print wait time for other user can be reduced.

A storage medium according to a third aspect is a storage medium in which a print control program is stored so as to be readable by a computer, said print control program comprising: a step of causing a computer connected to an image forming apparatus so as to be communicatable therebetween to set a print request; a step of causing said computer to transmit said print request to said image forming apparatus; and a step of causing said computer to report that an execution of at least a part of printing based on said print request was prohibited because said image forming apparatus was busy.

According to the third aspect, when the image forming apparatus judges that an execution of at least a part of printing based on a print request is prohibited, it is reported to a user that the execution of at least part of printing based on the print request is prohibited, whereby convenience for a user is improved.

With the first to third aspects, a print wait time for other user can be reduced.

The above and further objects and features will more fully be apparent from the following detailed description with accompanying drawings.

BRIEF DESCRIPTION OF THE SEVERAL VIEWS OF THE DRAWINGS

FIG. 3 is a schematic view showing busyness degree information by time zone according to Embodiment 3;

FIG. 8A is a flowchart showing a print processing according to Embodiment 7;

DETAILED DESCRIPTION

Embodiment 1

Embodiment 1 will be described below referring to FIGS. 1 and 2.

(1) Configuration of Printing System

Figure 1:
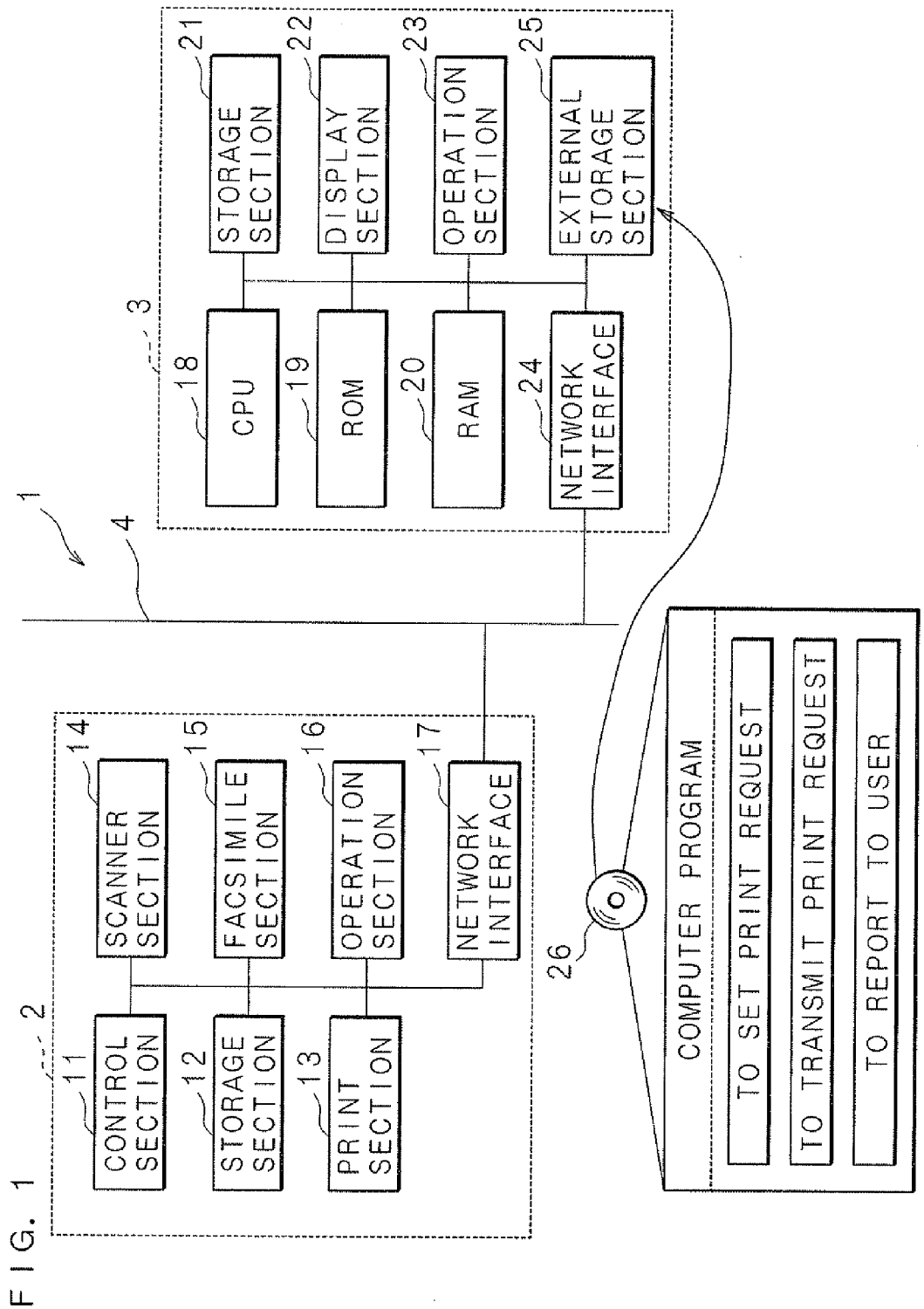
FIG. 1 is a schematic view showing a configuration of a printing system according to Embodiment 1.

FIG. 1 is a schematic view showing a configuration of a printing system 1. The printing system 1 comprises a multi-function peripheral 2 (an example of an image forming apparatus) having a scanner function, a printer function, a copying function, a facsimile function, etc., one or more personal computers 3 (PC), a communication network 4, such as LAN (Local Area Network), etc.

(1-1) Electrical Configuration of Multi-Function Peripheral

The multi-function peripheral 2 is equipped with a control section 11, a storage section 12, a print section 13, a scanner section 14, a facsimile section 15, an operation section 16, a network interface 17, etc.

The control section 11 (an example of controlling means, busyness degree judging means or priority judging means) is formed of a CPU, a ROM, a RAM, etc. The CPU controls the various sections of the multi-function peripheral 2 by executing various kinds of programs stored in the ROM. The ROM stores various kinds of programs to be executed by the CPU, data to be processed by the CPU, etc. The RAM serves as a main storage unit to be used when the CPU executes various kinds of processing.

The storage section 12 is an external storage unit for storing various kinds of data using a nonvolatile storage medium, such as a hard disk or a flash memory device, and stores a print request, busyness degree information by time zone, etc. transmitted from the PC 3.

The print section 13 (an example of printing means) forms an image using a laser method, an ink jet method, etc. on a recording medium, such as paper, on the basis of page data.

The scanner section 14 (an example of reading means) has a light source, a line sensor, etc. and reads a document illuminated by the light source using the line sensor to generate image data. The scanner section 14 may be a type of reading a document using a CIS (contact image sensor) or a type of reading a document using a reduction optical system.

The facsimile section 15 is connected to a switching system via a telephone network and transmits and receives facsimile data to and from an external facsimile apparatus according to a predetermined communication protocol.

The operation section 16 (an example of adding means, operating means, first reporting means, selecting means, second reporting means, displaying means or third reporting means) is equipped with a plurality of buttons, a liquid crystal display, etc. The user can perform various kinds of operations by operating the buttons while referring to a screen displayed on the liquid crystal display, for example.

The network interface 17 (an example of accepting means) is connected to an external device, such as the PC 3, via the communication network 4.

In this embodiment, the print section 13, the scanner section 14 and the facsimile section 15 can operate in parallel. In other words, for example, while the print section 13 executes printing, the scanner section 14 can read a document simultaneously.

(1-2) Electrical Configuration of PC

The PC 3 is equipped with a CPU 18, a ROM 19, a RAM 20, a storage section 21, a display section 22, an operation section 23, a network interface 24, an external storage section 25, etc.

The CPU 18 controls the various sections of the PC 3 by executing various kinds of programs stored in the ROM 19. The ROM 19 stores various kinds of programs to be executed by the CPU 18, data to be processed by the CPU 18, etc. The RAM 20 serves as a main storage unit to be used when the CPU 18 executes various kinds of processing.

The storage section 21 is an auxiliary storage unit for storing various kinds of programs and data using a nonvolatile storage medium, such as a hard disk or a flash memory device.

The display section 22 (an example of first reporting means, displaying means, second reporting means or third reporting means) is formed of a display unit, such as a CRT or a liquid crystal display.

The operation section 23 (an example of adding means, operating means, selecting means, setting means or reporting means) is formed of a mouse, a keyboard, etc.

The network interface 24 is connected to an external device, such as the multi-function peripheral 2, via the communication network 4.

The external storage section 25 is formed of a CD-ROM drive for example and reads computer programs, data, etc. from a portable storage medium (for example, a CD-ROM 26 on which a print control program is stored) under the control of the CPU 18. The computer programs, data, etc. having been read are written in the storage section 21.

A printer driver (an example of the print control program) for the multi-function peripheral 2 is stored in the storage section 21. When the user selects PRINT in an application program, such as a word processor, the CPU 18 executes the printer driver, and displays a setup window, not shown, for setting a print request. When the user sets a print request, the CPU 18 transmits the print request to the multi-function peripheral 2 via the network interface 24 (an example of transmitting means). The print request is received (accepted) via the network interface 17 of the multi-function peripheral 2.

(2) Print Request

A print request is information including various kinds of attribute information regarding printing. Specifically, the various kinds of attribute information include, for example, page data for a page to be printed, the number of print copies, print priority judgment information, print conditions (paper size, color/monochrome, one-side/double-side printing, enlarged/reduced printing, etc.), user ID, a name of the print request, a name of the PC, etc.

The page data may be, for example, data created using an application program or may be RGB bit-mapped images of the data or data obtained by converting the data into a page-description language interpretable by the multi-function peripheral 2. Furthermore, the page data may be data obtained by developing the data into rasterized data, i.e., binary images corresponding to the print dots of the print section 13.

The print priority judgment information (an example of judgment information) is information for judging whether printing based on a print request is executed preferentially. The expression that printing is executed preferentially means that printing based on a print request is executed completely, and the expression that printing is not executed preferentially means that an execution of at least a part of printing based on a print request is prohibited; in other words, at least a part of printing based on a print request is not executed.

For example, "high priority" or "low priority" may be set to the print priority judgment information. Furthermore, for example, it may be possible that the print priority judgment information is added to a print request only when printing is preferentially desired and that the print priority judgment information is not added when printing is not preferentially required. With such a setting, a print priority can be judged according to whether print priority judgment information is included in a print request.

The user ID is information for uniquely identifying a user who set a print request. For example, authentication information that is used when a user logs in the PC 3 can be used as the user ID.

The name of a print request is a name arbitrarily set by a user to discriminate the print request from other print requests. For example, there is a case where after a plurality of print requests are accepted by the multi-function peripheral 2, some of the print requests should be deleted. In such a case, a selection of the print requests to be deleted is made easy by using a method capable of setting the names of the print requests.

The name of the PC is a domain name, an IP address, etc. for uniquely identifying the PC from which a print request was transmitted to the multi-function peripheral 2.

(3) Print Processing in Printing System

Next, a print processing in the printing system 1 will be described below.

(3-1) General Description of Print Processing

According to this embodiment, when a print request is accepted by the multi-function peripheral 2, a busyness degree of the multi-function peripheral 2 and a print priority of the print request are judged. When the busyness degree of the multi-function peripheral 2 is high and the print priority of the print request is "low priority," printing based on the print request is not executed at all. In the following description, a processing in which printing based on a print request is not executed at all means that "the print request is canceled."

A busyness degree of the multi-function peripheral 2 indicates how frequently the multi-function peripheral 2 is used. How frequently the multi-function peripheral 2 is used may be determined, for example, according to a usage ratio of the multi-function peripheral 2 or according to a usage frequency of the multi-function peripheral 2.

A usage ratio of the multi-function peripheral 2 is defined as a proportion of the period of time during which the print section 13 executed printing to a predetermined period of time. When a busyness degree of the multi-function peripheral 2 is judged according to a usage ratio, the busyness degree is judged to be high if a usage ratio of the multi-function peripheral 2 during a predetermined period of time (for example, 30 minutes) before a new print request is accepted is a predetermined ratio or more, and the busyness degree is judged to be low if the usage ratio is less than the predetermined ratio, for example.

A usage frequency of the multi-function peripheral 2 is defined as the number of times print requests are accepted during a predetermined period of time. When a busyness degree of the multi-function peripheral 2 is judged according to a usage frequency, the busyness degree is judged to be high if the number of times print requests were accepted during a predetermined period of time before a new print request is accepted is a predetermined number of times or more, and the busyness degree is judged to be low if the number of times is less than the predetermined number of times, for example.

Furthermore, a busyness degree may also be judged according to both a usage ratio and a usage frequency, for example. More specifically, a busyness degree may be judged to be high if a usage ratio is a predetermined ratio or more and a usage frequency is a predetermined number of times or more, for example.

Moreover, a busyness degree of the multi-function peripheral 2 may be judged simply without actually obtaining a usage ratio or a usage frequency of the multi-function peripheral 2. For example, in the following cases (a) and (b), the busyness degree is expected to be high. The reason for this is that these situations hardly occur if the busyness degree of the multi-function peripheral 2 is low. Hence, in either of the following cases (a) and (b), a busyness degree can be simply judged to be high.

(a) When a print request is accepted, the printer 13 is executing printing based on another print request.

(b) A period of time from a time when printing of the last time was completed to a time when a new print request is accepted is within a predetermined period of time (for example, within one minute).

In this embodiment, a busyness degree of the multi-function peripheral 2 is judged simply.

(3-2) Detailed Description of Print Processing

Figure 2:
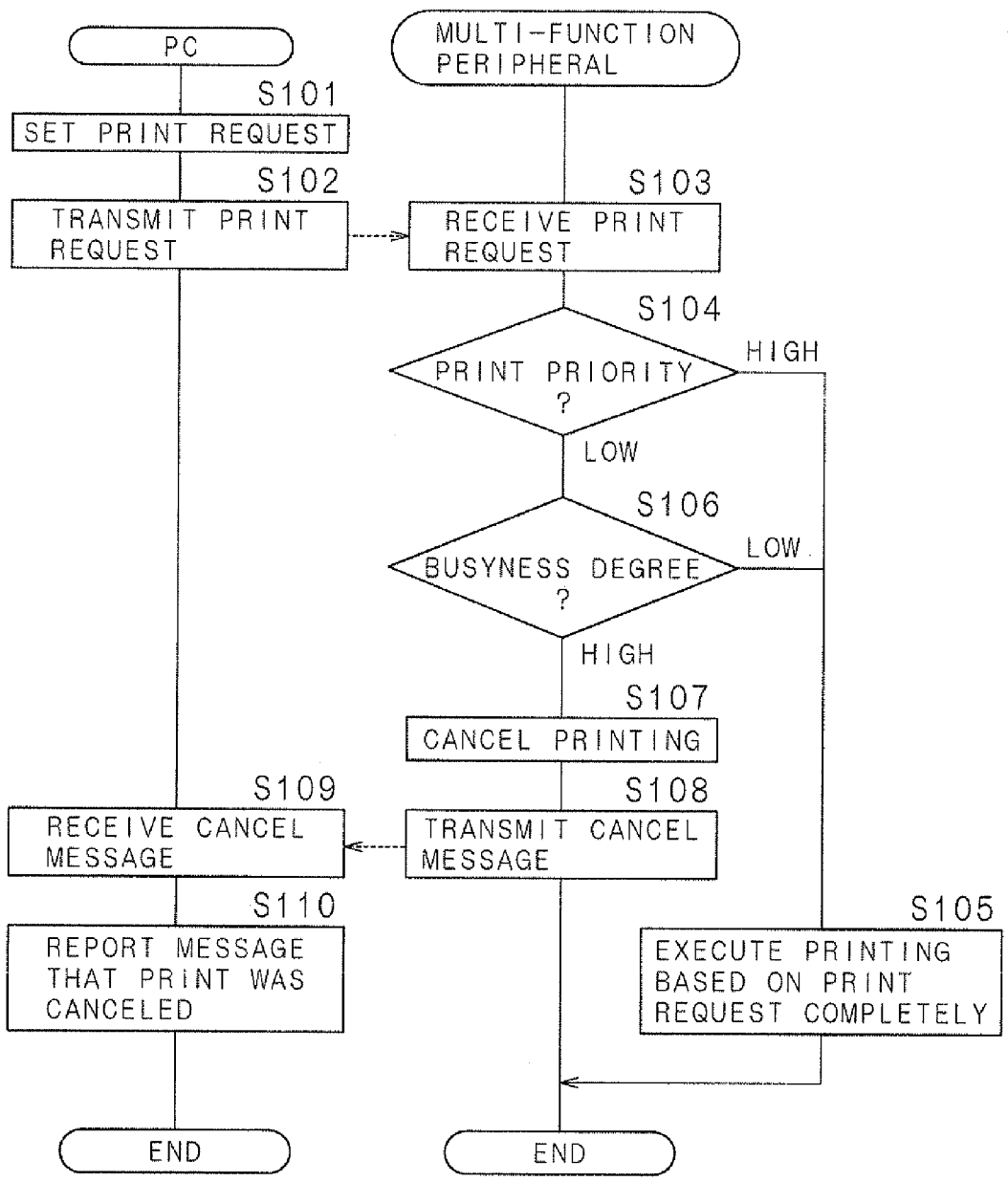
FIG. 2 is a flowchart showing a print processing.

FIG. 2 is a flowchart showing a print processing according to this embodiment.

At step S101, a user sets a print request by operating the PC 3.

At step S102, the CPU 18 of the PC 3 transmits the set print request to the multi-function peripheral 2.

At step S103, the control section 11 of the multi-function peripheral 2 receives the print request transmitted from the PC 3 via the network interface 17.

At step S104, the control section 11 judges a print priority of the received print request. When the print priority is judged to be high, the control sequence of the CPU 18 advances to step S105, and when the print priority is judged to be low, the control sequence advances to step S106.

At step S105, the control section 11 controls the respective sections of the multi-function peripheral 2 and completely executes printing based on the print request.

At step S106, the control section 11 simply judges a busyness degree of the multi-function peripheral 2 as described above. When the control section 11 does not judge that the busyness degree is high, that is, when the control section 11 judges that the busyness degree is low, the control sequence advances to step S105, and when the control section 11 judges that the busyness degree is high, the control sequence advances to step S107.

At step S107, the control section 11 cancels printing based on the received print request.

At step S108, the control section 11 transmits a message that the printing was canceled (a cancel message) to the PC 3.

At step S109, the CPU 18 of the PC 3 receives the cancel message via the network interface 24.

At step S110, the CPU 18 causes the display section 22 to display the message that the printing based on the print request was canceled, thereby reporting the message to the user. The message that the printing was canceled may be reported by using another method, provided that the user can recognize the message. For example, vocal guidance may be used.

(4) Effects of Embodiment

With the multi-function peripheral 2 according to Embodiment 1 described above, when a busyness degree of the multi-function peripheral 2 is high, an execution of at least a part of printing based on a print request is prohibited, whereby a print wait time for other user can be reduced.

In addition, with the multi-function peripheral 2, when a print priority of a print request is high, printing based on the print request is executed completely regardless of a busyness degree of the multi-function peripheral 2. When a print priority of a print request is high, it is sometimes preferable that the printing based on the print request should be executed completely even if a print wait time for other user may become long. With the multi-function peripheral 2, convenience for a user who requests printing having high priority is improved.

Furthermore, with the multi-function peripheral 2, a user can set a print priority. Hence, the user who wishes to execute printing based on a print request completely can execute the printing based on the print request completely by setting the print priority as "high priority" regardless of a busyness degree of the multi-function peripheral 2, whereby convenience for a user is improved.

Moreover, with the multi-function peripheral 2, when the print section 13, the scanner section 14 and the facsimile section 15 can operate in parallel with one another, a busyness degree of the multi-function peripheral 2 is judged to be high when a busyness degree of the print section 13 is high. Hence, a busyness degree of the multi-function peripheral 2 is prevented from being judged to be high because a busyness degree of the scanner section 14 is high although a busyness degree of the print section 13 is low.

Still further, with the multi-function peripheral 2, in a case where the print section 13 is executing printing based on another print request when a print request is accepted, a busyness degree of the multi-function peripheral 2 is judged to be high. In a case where the print section 13 is executing printing based on another print request when a print request is accepted, there is a high possibility that the multi-function peripheral 2 is used frequently. Hence, a busyness degree of the multi-function peripheral 2 can be judged properly by judging that the busyness degree is high in a case where the print section 13 is executing printing based on another print request when a print request is accepted.

Moreover, with the multi-function peripheral 2, when a period of time from a time when printing of the last time was completed to a time when a new print request is accepted is within a predetermined time, a busyness degree of the multi-function peripheral 2 is judged to be high. When the period of time from a time when printing of the last time was completed to a time when a new print request is accepted is within the predetermined time, there is a high possibility that the multi-function peripheral 2 is used frequently. Hence, a busyness degree of the multi-function peripheral 2 can be judged properly by judging that a busyness degree is high when a period of time from a time when printing of the last time was completed to a time when a new print request is accepted is within a predetermined time.

Additionally, with the printer driver according to Embodiment 1, when an execution of printing based on a print request is prohibited because a busyness degree of the multi-function peripheral 2 is high (when the print request is canceled), this message is reported to a user, whereby convenience for a user is improved.

Embodiment 2

Next, Embodiment 2 will be described below.

In Embodiment 2, a print priority of a print request is judged on the basis of attribute information included in a print request, instead of prompting a user to set print priority judgment information.

Since the flowchart according to Embodiment 2 is substantially the same as the flowchart shown in FIG. 2, the description thereof is omitted. However, Embodiment 2 differs from Embodiment 1 in that print priority judgment information is not set at step S101 and that a print priority is judged as described below at step S104.

At step S104 according to Embodiment 2, a print priority of a print request is judged on the basis of attribute information included in the print request. More specifically, for example, the control section 11 obtains the number of sheets to be printed from the number of pages specified by page data included in the print request and the number of copies to be printed included in the print request. When the number of sheets to be printed is a predetermined number of sheets or more, other user is kept waiting for a long time if printing is executed on the basis of the print request, therefore the control section 11 judges that the print priority is "low priority." On the other hand, when the number of sheets to be printed is less than the predetermined number of sheets, there is a low possibility that other users are kept waiting for a long time, therefore the control section 11 judges that the print priority is "high priority."

Furthermore, the print priority may also be judged on the basis of attribute information, such as a user ID, a name of a print request, a name of a PC, etc. More specifically, for example, it may be possible that a user ID and a print priority are stored so as to correspond to each other in the storage section 12 in advance and that a print priority of the print request is judged according to the print priority corresponding to the user ID. The judgment may also be made similarly with respect to a name of a print request and a name of a PC.

With the multi-function peripheral 2 according to Embodiment 2 described above, a print priority can be judged, instead of prompting a user to set a print priority.

Embodiment 3

Next, Embodiment 3 will be described below referring to FIG. 3.

In Embodiment 3, as another example in which a busyness degree of the multi-function peripheral 2 is judged, a case where a busyness degree is judged according to a past tendency of a busyness degree will be described below.

FIG. 3 is a view schematically showing an example of a past tendency of a busyness degree. Busyness degree information by time zone is herein explained as an example of the past tendency of the busyness degree. In the busyness degree information by time zone shown as an example in FIG. 3, one day is hourly divided into time zones and the past busyness degrees are associated with the respective time zones.

For example, in a case where a print result is required at a certain time every day, time zones in which a busyness degree of the multi-function peripheral 2 becomes high and time zones in which a busyness degree of the multi-function peripheral 2 becomes low in one day are determined generally. In such a case, a busyness degree can be judged at a considerably high accuracy even when a busyness degree of the multi-function peripheral 2 is judged by obtaining a busyness degree in a time zone including a time when a print request is accepted from the busyness degree information by time zone.

When time zones in which a busyness degree becomes high differ depending on the day of the week, the busyness degree information by time zone may be provided for each day of the week.

Since the flowchart according to Embodiment 3 is substantially the same as the flowchart shown in FIG. 2, the description thereof is omitted. However, Embodiment 3 differs from Embodiment 1 in that a busyness degree of the multi-function peripheral 2 is judged at step S106 according to a past tendency of a busyness degree as described above.

With the multi-function peripheral 2 according to Embodiment 3 described above, a busyness degree of the multi-function peripheral 2 can be judged properly by judging that a busyness degree of the multi-function peripheral 2 is high when a time when a print request is accepted is included in a time zone in which a busyness degree is high.

Embodiment 4

Next, Embodiment 4 will be described below referring to FIG. 4.

In Embodiment 4, when a busyness degree of the multi-function peripheral 2 is judged to be high, a part of printing based on a print request is prohibited, instead of canceling the printing based on the print request.

Figure 4:
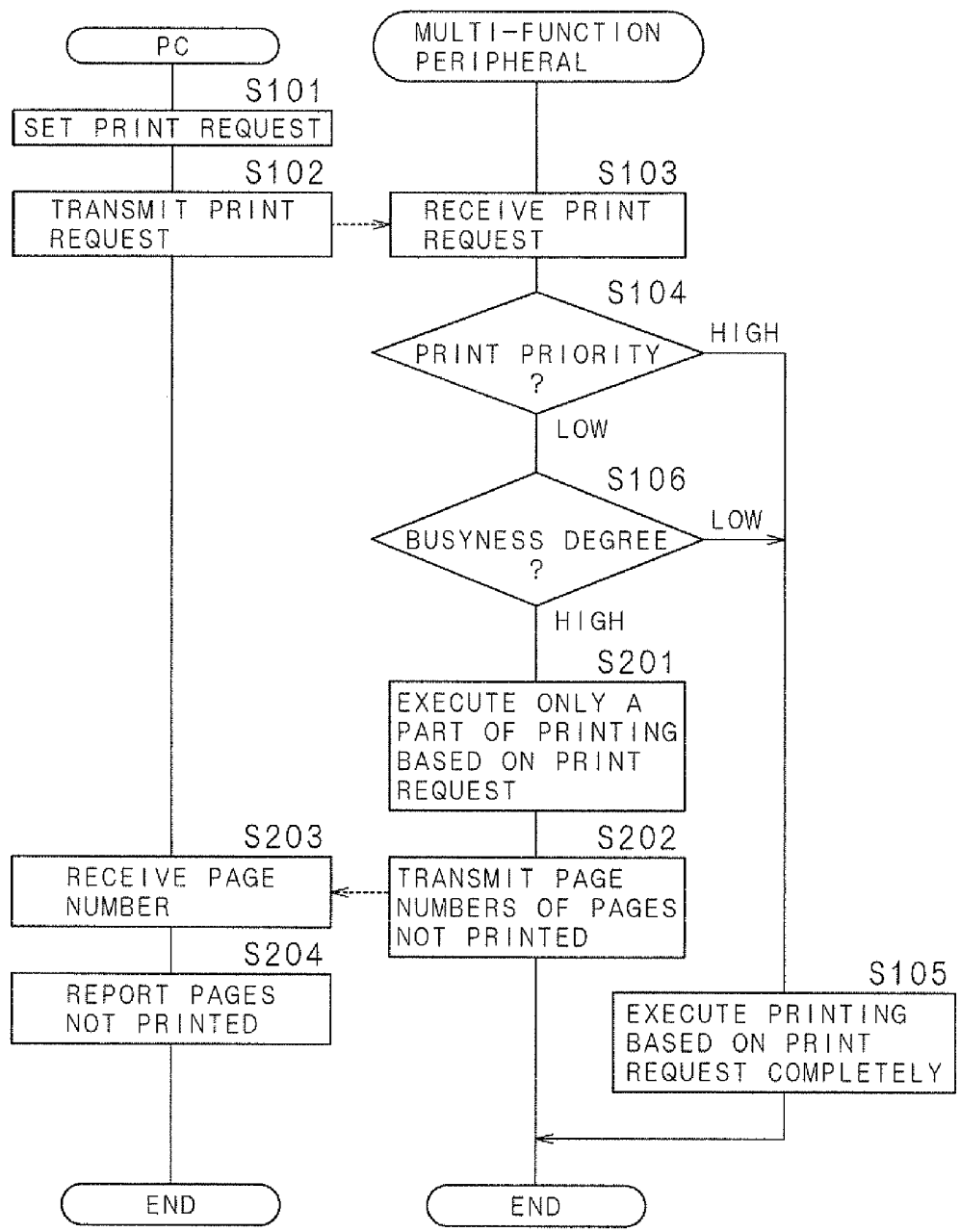
FIG. 4 is a flowchart showing a print processing according to Embodiment 4.

FIG. 4 is a flowchart showing a print processing according to Embodiment 4. Steps substantially the same as those in the flowchart shown in FIG. 2 are designated by the same codes and their detailed descriptions are omitted.

At step S201, the control section 11 executes only a part of printing based on a print request.

When only a part of the printing based on the print request is executed, various methods can be used as a method for selecting the part of the printing.

For example, several pages behind the first page of the whole page data (referred to as "forward pages") may be printed, or several pages ahead of the last page thereof (referred to as "backward pages") may be printed.

Furthermore, for example, the judgment may be made on the basis of attributes of each page. More specifically, for example, a time required when printing is executed in color takes longer than a time required when printing is executed in monochrome. For this reason, it may be possible that only pages having a higher monochrome ratio (referred to as "monochrome pages") are printed and that pages having a higher color ratio (referred to as "color pages") are not printed.

Moreover, for example, it may also be possible that a user sets a print priority for each page and that only pages having high print priority are printed.

At step S202, the control section 11 transmits the page numbers of the pages not printed at step S201 to the PC 3.

At step S203, the PC 3 receives the page numbers via the network interface 24.

At step S204, the CPU 18 reports the pages not printed to the user by displaying the received page numbers on the display section 22. Instead of reporting the pages not printed, the printed pages may also be reported.

With the multi-function peripheral 2 according to Embodiment 4 described above, a part of printing based on a print request is executed. Hence, convenience for a user who has set a print request is improved in comparison with a case where the printing is not executed at all. Furthermore, a waiting time of other user in this case become short in comparison with a case where the printing based on the print request is executed completely, whereby convenience for other user is not impaired greatly.

Moreover, with the printer driver according to Embodiment 4, when the multi-function peripheral 2 prohibits an execution of a part of printing based on a print request, pages not printed are reported to a user, whereby convenience for a user is improved further.

Embodiment 5

Next, Embodiment 5 will be described below referring to FIGS. 5 and 6.

In Embodiment 5, when a busyness degree of the multi-function peripheral 2 is judged to be high and that an execution of at least a part of printing based on a print request is prohibited, a user is prompted to select pages not to be printed.

Figure 5:
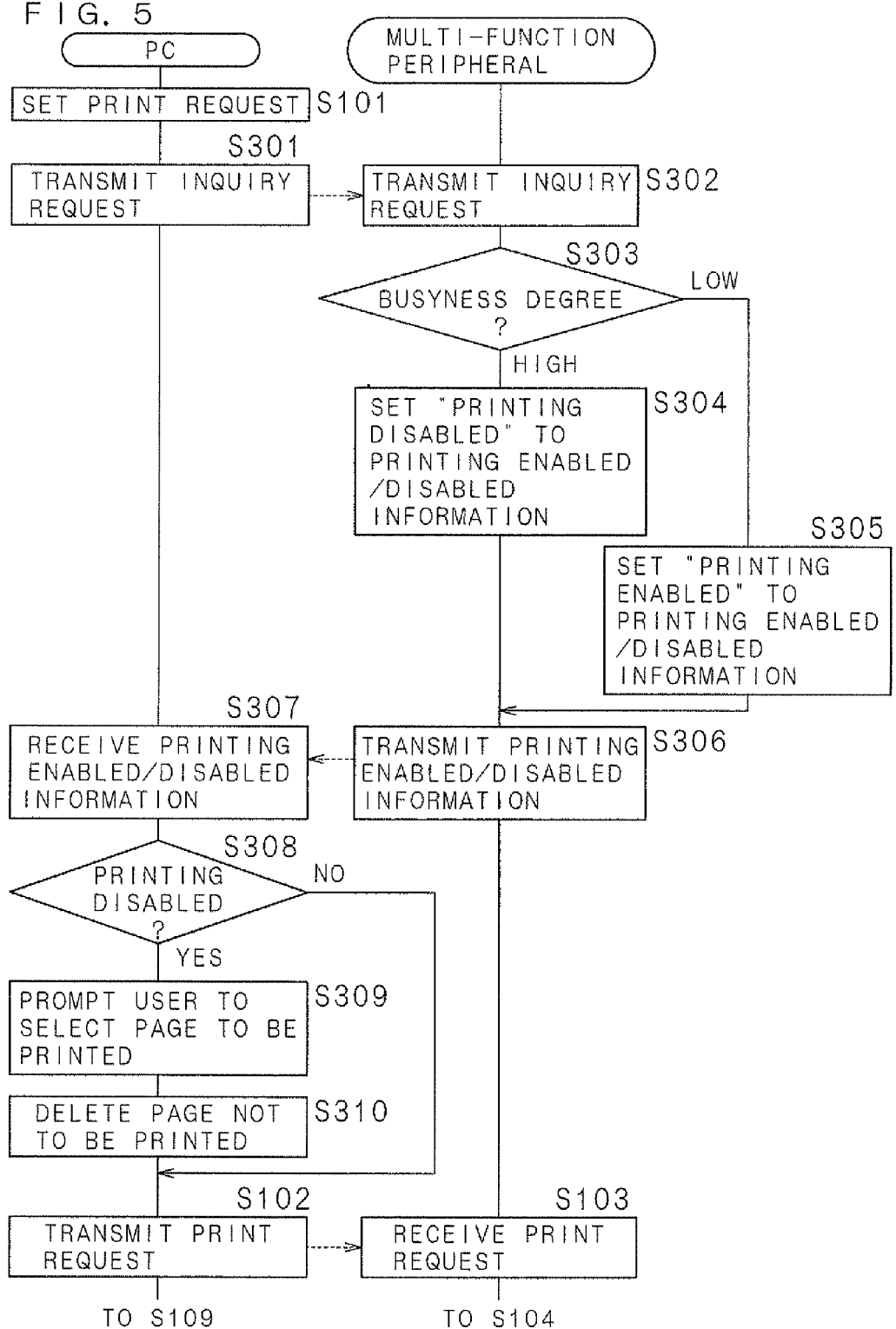
FIG. 5 is a flowchart showing a print processing according to Embodiment 5.
Figure 6:
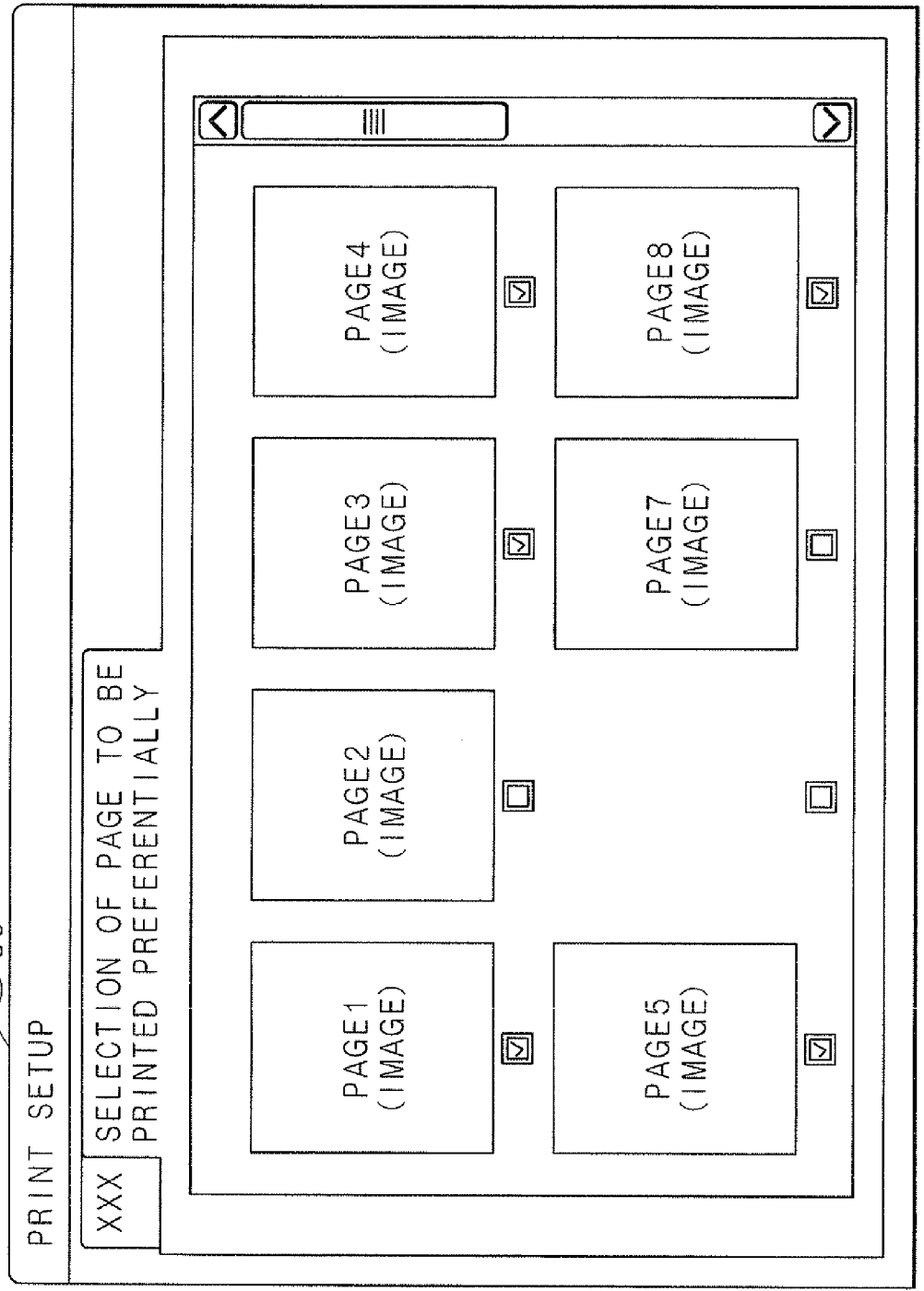
FIG. 6 is a schematic view showing a selection window for selecting pages to be printed.

FIG. 5 is a flowchart showing a print processing according to Embodiment 5. Steps substantially the same as those in the flowchart shown in FIG. 2 are designated by the same codes and their detailed descriptions are omitted.

At step S301, the CPU 18 of the PC 3 transmits an "inquiry request" to the multi-function peripheral 2. The "inquiry request" is used to inquire of the multi-function peripheral 2 about a busyness degree of the multi-function peripheral 2.

At step S302, the control section 11 of the multi-function peripheral 2 receives a "inquiry request" transmitted from the PC 3 via the network interface 17.

At step S303, the control section 11 judges a busyness degree of the multifunction peripheral 2. When the control section 11 judges that the busyness degree is high, the control sequence advances to step S304, and when the control section 11 judges that the busyness degree is low, the control sequence advances to step S305.

At step S304, the control section 11 sets "printing disabled" to "printing enabled/disabled information" serving as information to be transmitted to the PC 3 in response to the "inquiry request."

At step S305, the control section 11 sets "printing enabled" to the "printing enabled/disabled information".

At step S306, the control section 11 transmits the "printing enabled/disabled information" to the PC 3.

At step S307, the CPU 18 of the PC 3 receives the "printing enabled/disabled information" via the network interface 24.

At step S308, the CPU 18 judges whether "printing disabled" or "printing enabled" is set to the "printing enabled/disabled information." When "printing disabled" is set, the control sequence of the CPU 18 advances to step S309, and when "printing enabled" is set, the control sequence advances to step S102.

At step S309, the CPU 18 prompts a user to select pages not to be printed.

The pages not to be printed may be selected directly by prompting a user to select the pages not to be printed or may be selected indirectly by prompting a user to select pages to be printed. A case where pages not to be printed are selected indirectly by prompting a user to select pages to be printed is herein explained as an example and described below.

With respect to the selection of pages to be printed, "forward pages" or "backward pages" may be selected, or "color pages" or "monochrome pages" may be selected, for example. Furthermore, for example, it may be possible that a print setup window 30 is displayed as shown in FIG. 6 in which all the pages are shown in reduced size in preview mode and that a user is prompted to select pages to be printed from all the pages.

The CPU 18 waits until the selection of the pages by the user is completed. After the selection of the pages is completed, the control sequence advances to step S310.

At step S310, the CPU 18 deletes pages other than the pages selected at step S309 from the print request set at step S101. In other words, the CPU 18 deletes the pages not to be printed from the print request.

Since the following steps are substantially the same as those in Embodiment 1, the detailed descriptions thereof are omitted.

With the multi-function peripheral 2 according to Embodiment 5 described above, when an execution of a part of printing based on a print request is prohibited, a user can select pages not to be printed.

Furthermore, with the printer driver according to Embodiment 5, all the pages are shown in preview mode on the display section 22 and a user is prompted to perform selection, whereby a user can easily select pages not to be printed.

Embodiment 6

Next, Embodiment 6 will be described below referring to FIGS. 7A and 7B.

In Embodiment 6, when a busyness degree of the multifunction peripheral 2 is judged to be high and an execution of at least a part of printing based on a print request is prohibited, printing of pages prohibited to be printed (pages not printed) is executed when the busyness degree of the multi-function peripheral 2 is low.

Figure 7A:
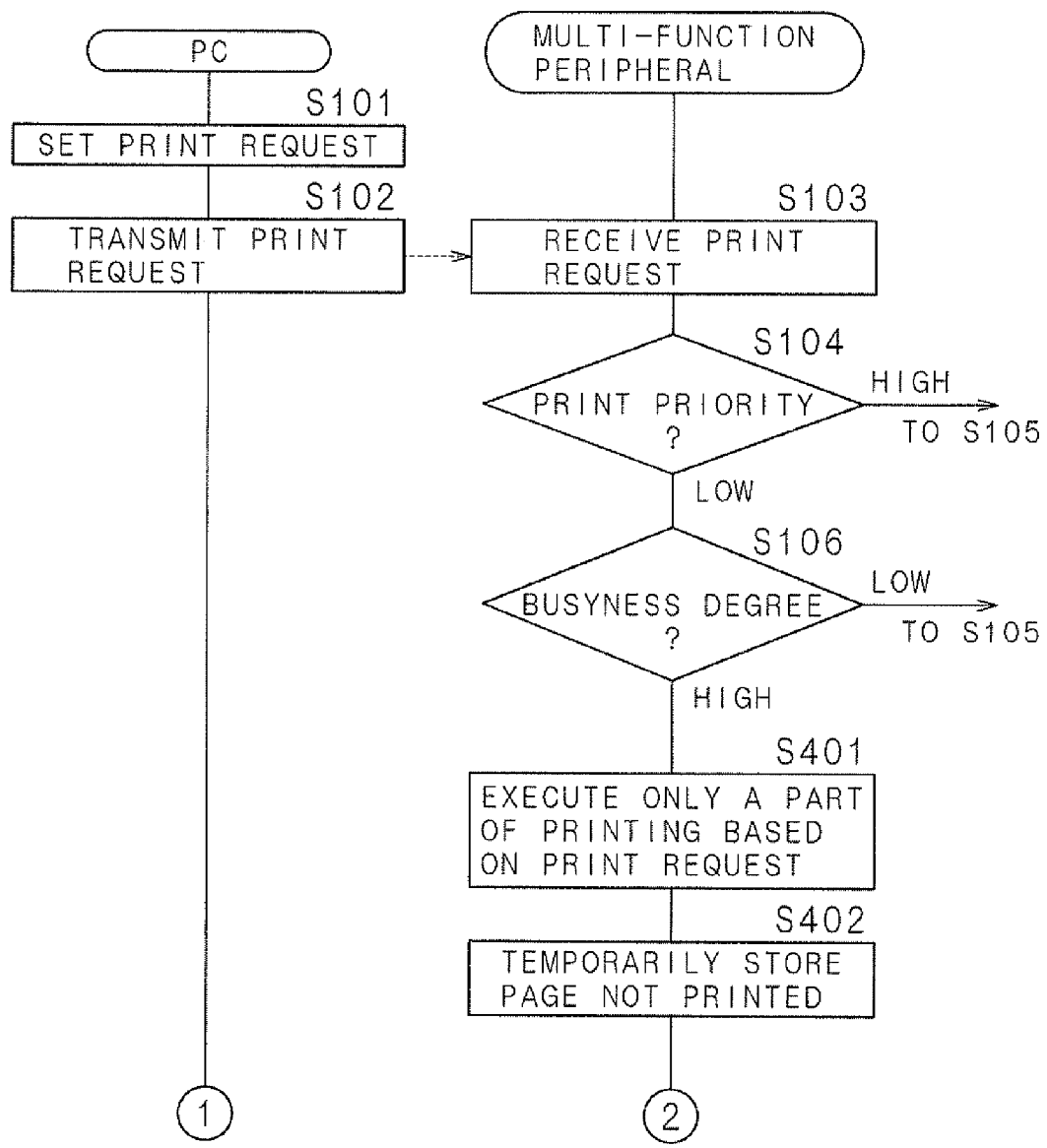
FIG. 7A is a flowchart showing a print processing according to Embodiment 6.
Figure 7B:
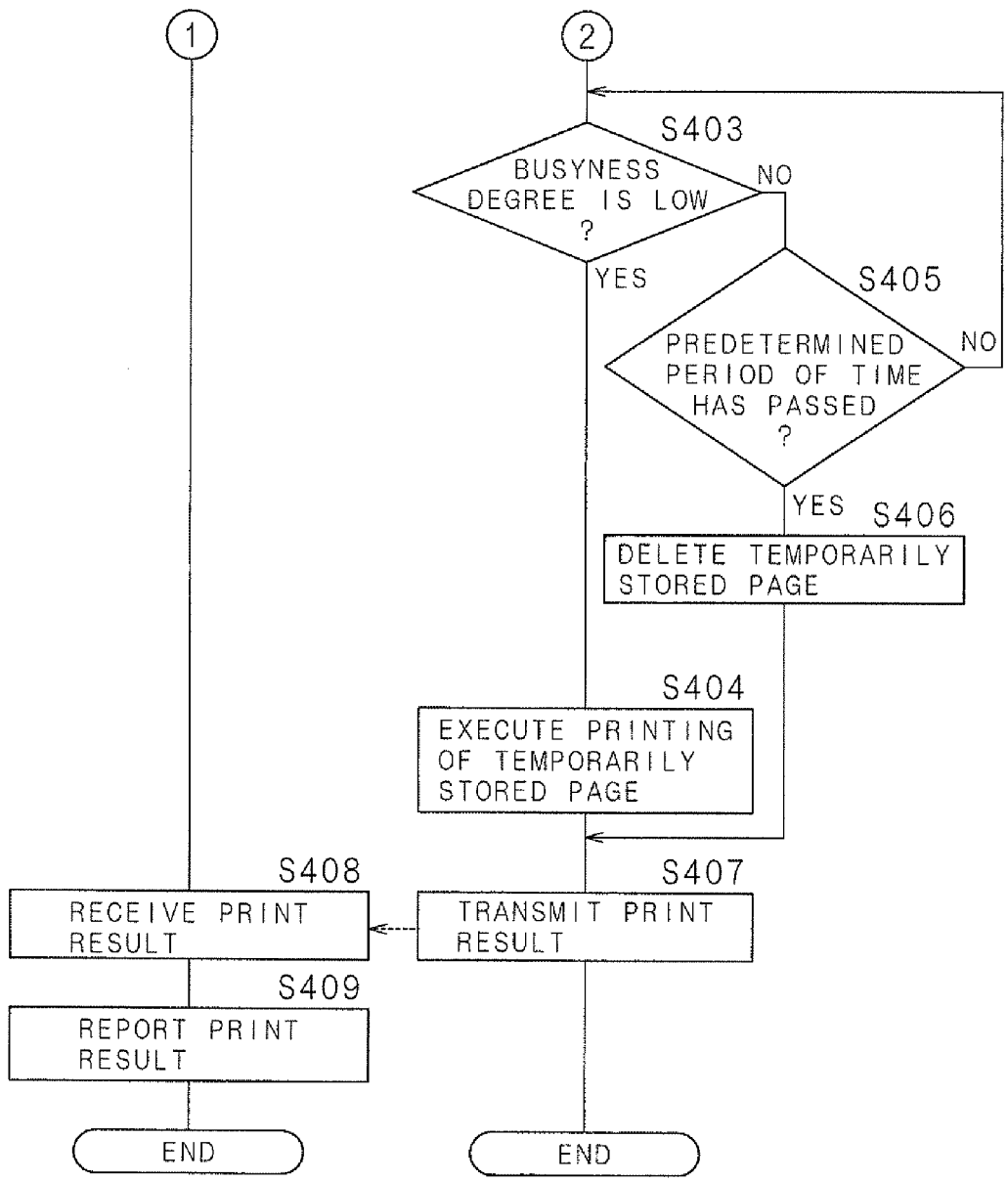
FIG. 7B is a flowchart showing the print processing.

FIGS. 7A and 7B are flowcharts showing a print processing according to Embodiment 6. Steps substantially the same as those in the flowchart shown in FIG. 2 are designated by the same codes and their detailed descriptions are omitted.

At step S401, the control section 11 executes only a part of printing based on a print request.

At step S402, the control section 11 temporarily stores pages other than the pages printed at step S401, i.e., the pages not printed.

At step S403, the control section 11 judges whether a busyness degree of the multifunction peripheral 2 is low. When the busyness degree of the multifunction peripheral 2 is low, the control sequence of the control section 11 advances to step S404. When the busyness degree is not low, the control sequence advances to step S405.

At step S404, the control section 11 executes printing of the temporarily stored pages.

At step S405, the control section 11 judges whether a predetermined period of time or more (for example, one hour or more) has passed after the pages not printed were stored temporarily in the storage section 102 (at step S402). When the predetermined period of time or more has not passed, the control sequence of the control section 11 returns to step S403. When the predetermined period of time or more has passed, the control section 11 cancels printing of the pages not printed and the control sequence advances to step S406. The reason why the printing is canceled when the predetermined period of time or more has passed is that when a very long time has passed, there is a possibility that a user no longer requires the print result.

At step S406, the control section 11 deletes the temporarily stored pages from the storage section 12.

At step S407, when the temporarily stored pages were printed, the control section 11 transmits a message that the printing was executed (a printing execution message) to the PC 3 as the print result. When the temporarily stored pages were deleted, the control section 11 transmits a message that the deletion was executed (a deletion message) to the PC 3 as the print result.

At step S408, the CPU 18 of the PC 3 receives the print result via the network interface 24.

At step S409, the control section 11 causes the display section 22 of the PC 3 to display a message that the printing of the pages not printed (the temporarily stored pages) at step S402 was executed or to display a message that the printing of the pages not printed (the temporarily stored pages) at step S402 was canceled, thereby reporting the message to the user.

With the multi-function peripheral 2 according to Embodiment 6 described above, printing of pages prohibited to be printed is executed when a busyness degree of the multi-function peripheral 2 is low, whereby convenience for a user is improved.

Moreover, with the printer driver according to Embodiment 6, in a case where pages not printed because of high busyness degree of the multi-function peripheral 2 were printed when the busyness degree of the multi-function peripheral 2 was low, this effect is reported to a user, whereby convenience for a user is improved.

Embodiment 7

Next, Embodiment 7 will be described below referring to FIGS. 8A, 8B and 9.

Embodiment 7 is a modified example of Embodiment 6. In a case where pages not printed are printed when a busyness degree of the multi-function peripheral 2 is low, a user can preliminarily specify a time zone during which printing is executed.

Figure 8B:
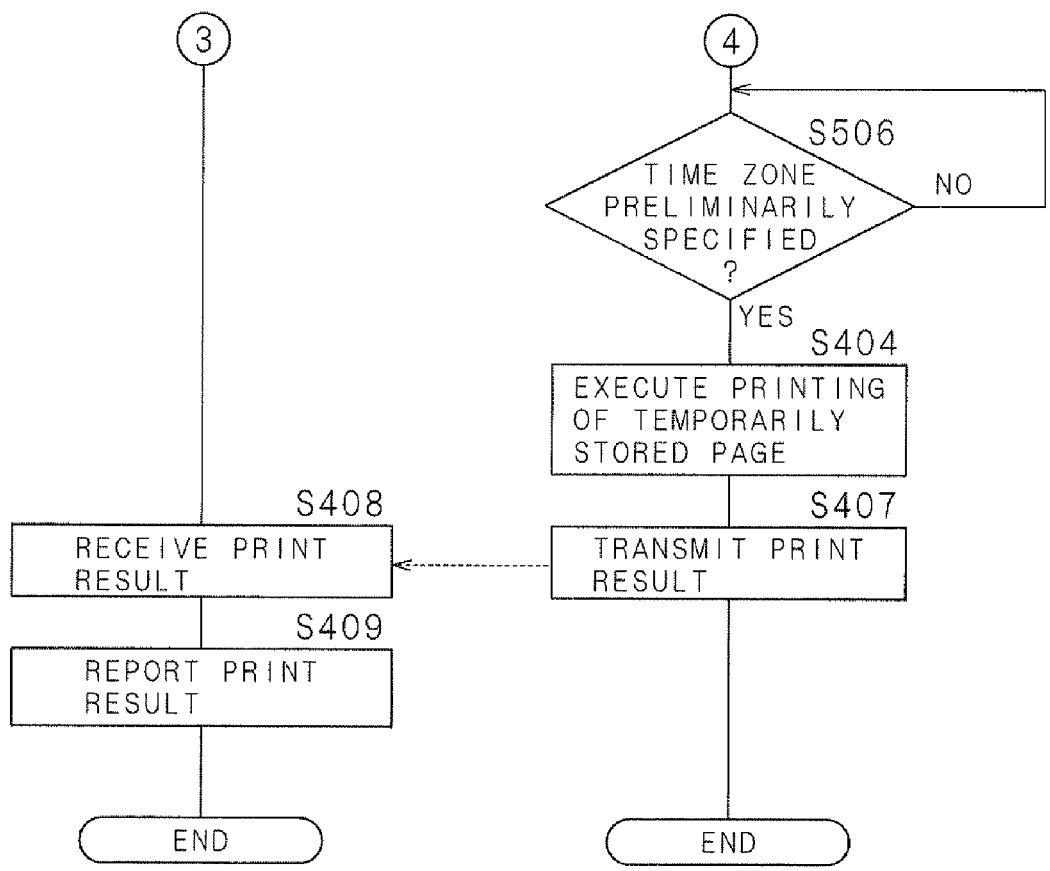
FIG. 8B is a flowchart showing the print processing.

FIGS. 8A and 8B are flowcharts showing a print processing according to Embodiment 7. Steps substantially the same as those in the flowchart shown in FIGS. 7A and 7B are designated by the same codes and their detailed descriptions are omitted.

At step S501, the control section 11 transmits busyness degree information by time zone to the PC 3.

At step S502, the CPU 18 of the PC 3 receives the busyness degree information by time zone via the network interface 24.

Figure 9:
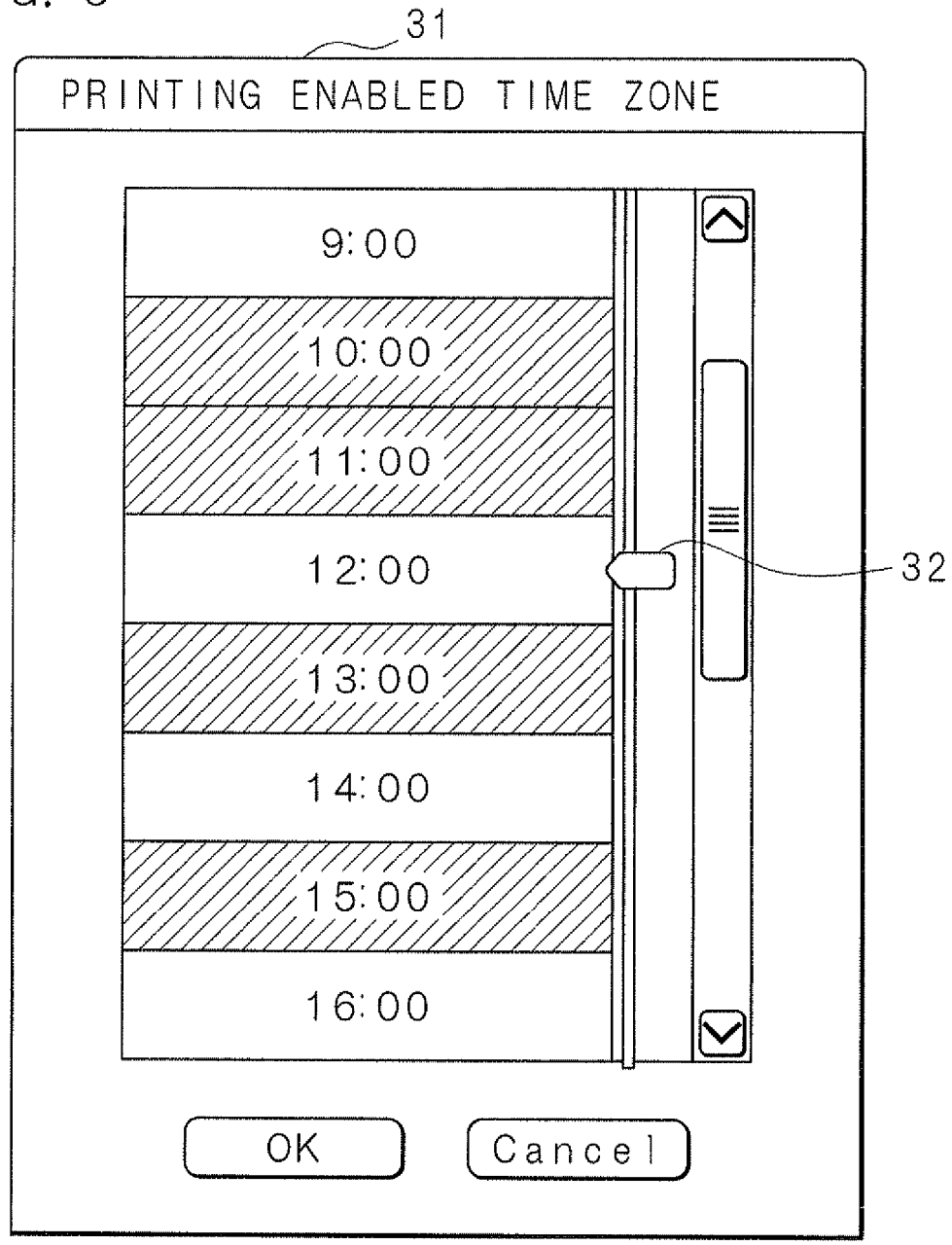
FIG. 9 is a schematic view showing a printing enabled time zone window for preliminarily specifying a time zone.

At step 503, the CPU 18 causes the display section 22 to display a printing enabled time zone window 31 through which a user preliminarily specifies a time zone on the basis of the busyness degree information by time zone as shown in FIG. 9.

In the printing enabled time zone window 31 shown as an example in FIG. 9, backgrounds of time zones in which a busyness degree is high (printing disabled time zones) are indicated dark, and backgrounds of time zones in which a busyness degree is low (printing enabled time zones) are indicated bright. A user preliminarily specifies a time zone by moving a slider 32 with the mouse to one of the printing enabled time zones. In this embodiment, the slider 32 cannot be moved to the printing disabled time zones.

At step 504, the CPU 18 transmits the time zone preliminarily specified by the user to the multi-function peripheral 2.

At step 505, the control section 11 of the multi-function peripheral 2 receives the time zone preliminarily specified by the user.

At step 506, the control section 11 judges whether the current time has reached the time zone preliminarily specified. When the current time has reached the time zone preliminarily specified, the control sequence advances to step S404.

With the multi-function peripheral 2 according to Embodiment 7 described above, in a case where pages not printed are printed when a busyness degree of the multi-function peripheral 2 is low, a user can preliminarily specify a time zone during which printing is executed, whereby convenience for a user is improved.

Other Embodiments

The present invention is not limited to the embodiments described above referring to the drawings, but, for example, the following embodiments are also included in the technical scope of the present invention.

(1) In Embodiment 1 described above, (a) the case where a busyness degree at a time when a print request is accepted is judged or (b) the case where a busyness degree within a predetermined period of time before a print request is accepted is judged is explained as an example. However, a busyness degree may be judged subsequently after a print request is accepted. For example, when within a predetermined time (for example, within one minute) after a print request (a preceding print request) was accepted, another print request (a new print request) is accepted, a busyness degree is judged to be high subsequently. When the busyness degree is judged to be high subsequently and an unprinted part is still present in the preceding print request at the time, an execution of printing of the unprinted part may be prohibited. With this method, a print wait time for another user who set a new print request can be reduced.

(2) In the embodiments described above, the case where a busyness degree of the multi-function peripheral 2 is judged according to a busyness degree of the print section 13 is explained as an example. However, a busyness degree of the multi-function peripheral 2 may be judged according to a busyness degree of a section other than the print section 13.

More specifically, for example, in a case where the print section 13, the scanner section 14 and the facsimile section 15 cannot operate in parallel or in a case where while one of the sections is operating, operations of the other sections are delayed, if a busyness degrees of the scanner section 14 and the facsimile section 15 are high even if the busyness degree of the print section 13 is low, the print section 13 cannot be used or the operation of the print section 13 is delayed eventually. It can be said that this state is the same as that in which a usage ratio of the print section 13 is high. Hence, when a busyness degree of the scanner section 14 or the facsimile section 15 is high, in other words, when a busyness degree of the other section affecting the operation of the print section 13 is high, a busyness degree of the multi-function peripheral 2 may be judged to be high.

Furthermore, for example, when another user is operating the operation section 16 when a print request is accepted, there is a high possibility that the multi-function peripheral 2 is used frequently, and therefore, a busyness degree of the multi-function peripheral 2 may be judged to be high. More specifically, when the operation section 16 is being used, there is a high possibility that a user operating the operation section 16 is going to use the copying function, the scanner function, etc. although the copying function, the scanner function, etc. are not used at the time. If printing based on print request is executed completely, there is a high possibility that the user operating the operation section 16 is kept waiting for a long time. Hence, also in this case, it is appropriate that a busyness degree of the multi-function peripheral 2 is judged to be high.

(3) In the embodiments described above, a print request is set through the PC 3. However, a print request may also be set through the operation section 16 (an example of accepting means). For example, when using the copying function, a user sets the number of copies, enlarged/reduced printing, paper size, etc. through the operation section 16. Information regarding these is included in a print request when the copying function is used. In addition, for example, the multi-function peripheral is equipped with a direct print function in some cases. The direct print function is a function in which the multi-function peripheral directly prints an image stored in a USB mass storage device connected to a USB host interface provided in the multi-function peripheral. When using the direct print function, a user sets an image to be printed, the number of copies, enlarged/reduced printing, paper size, etc. through the operation section 16. Information regarding these is included in a print request when the direct print function is used.

In a case where a print request is set through the operation section 16 of the multi-function peripheral 2, various kinds of the processing (the processing of reporting a message that printing is canceled, the processing of prompting a user to select pages not to be printed, etc.) performed when the PC 3 executes the printer driver in the embodiment described above are, for example, displayed on the liquid crystal display of the operation section 16 of the multi-function peripheral 2 and executed.

(4) In the embodiments described above, the case where six pages out of ten pages are not printed is explained as an example of a case where a part of printing based on a print request is prohibited. However, for example, a part of the number of copies (for example, three copies out of ten copies) to be printed may be printed and the remaining seven copies may not be printed. In this case, all the pages are printed at least once.

With this embodiment, convenience for a user who requests printing having high print priority is improved.

With this embodiment, for example, a user who wishes to execute printing based on a print request completely can execute the printing based on the print request completely by adding judgment information that is judged to be high in print priority.

With this embodiment, a print priority can be judged without prompting a user to set a print priority.

With this embodiment, a busyness degree of the image forming apparatus is prevented from being judged to be high because a busyness degree of the reading means is high although a busyness degree of the printing means is low.

In a case where printing based on another print request is being executed when a print request is accepted by the accepting means, there is a high possibility that the image forming apparatus is used frequently. Hence, a busyness degree of the image forming apparatus can be judged properly by judging that a busyness degree is high when printing based on another print request is being executed.

When a period of time from a time when printing of the last time was completed to a time when a new print request is accepted by the accepting means is within a predetermined time, there is a high possibility that the image forming apparatus is used frequently. Hence, a busyness degree of the image forming apparatus can be judged properly by judging that a busyness degree is high when a period of time from a time when printing of the last time was completed to a time when a new print request is accepted is within the predetermined time.

When the current time is within a time zone in which a busyness degree is high, there is a high possibility that the image forming apparatus is used frequently. Hence, a busyness degree of the image forming apparatus can be judged properly by judging that a busyness degree is high when a time when a print request is accepted is within a time zone in which a busyness degree is high.

In a case where another user is operating the operating means when a print request is accepted by the accepting means, there is a high possibility that the image forming apparatus is used frequently. Hence, a busyness degree of the image forming apparatus can be judged properly by judging that a busyness degree is high when another user is operating the operating means when a print request is accepted by the accepting means.

With this embodiment, even when a busyness degree of the image forming apparatus was low when a preceding print request was accepted, if a new print request is accepted within a predetermined time, the busyness degree is judged to be high subsequently. In this case, a print wait time for another user can be reduced by prohibiting an execution of at least a part of printing based on the preceding print request.

With this embodiment, convenience for a user is improved.

With this embodiment, a user can select pages that are prohibited to be printed.

With this embodiment, pages that are prohibited to be printed can be selected easily.

With this embodiment, at least a part of printing that is prohibited to be executed is executed when a busyness degree of the image forming apparatus is low, whereby convenience for a user is improved.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus, comprising:
a print section;
and
a processor comprising hardware which causes said print section to execute printing based on a received print request and judges whether or not the image forming apparatus is busy when said print request is received, wherein said processor comprising hardware is further configured to:
determine a first timing when printing of a print job associated with a preceding print request is completed;
determine whether said print request is received;
determine a second timing when said print request is received;
determine a time period between the first timing and the second timing;
determine whether the time period between the first timing and the second timing is less than a predetermined time period;
judge that the image forming apparatus is busy when the time period between the first timing and the second timing is less than the predetermined time period; and
judge that the image forming apparatus is not busy when the time period between the first timing and the second timing is not less than the predetermined time period,
wherein when the image forming apparatus is busy, said processor comprising hardware prohibits an execution of at least a part of the printing based on said print request and when the image forming apparatus is not busy, said processor comprising hardware controls the print section to completely execute the printing based on said print request.

2. The image forming apparatus according to claim 1, further comprising an operation section comprising a liquid crystal display for adding judgment information for judging whether or not said print request prioritizes printing, to said print request.

3. The image forming apparatus according to claim 1, wherein said processor comprising hardware is further configured to judge whether or not the print request prioritizes printing, based on attribute information of said print request.

4. The image forming apparatus according to claim 1, wherein said processor comprising hardware is further configured to judge whether or not said print section is busy.

5. The image forming apparatus according to claim 4, wherein said processor comprising hardware judges that the image forming apparatus is busy in a case where said print section is executing printing based on another print request when a print request is received.

6. The image forming apparatus according to claim 1, wherein said operation section comprising a liquid crystal display further reports that the execution of at least a part of the printing based on said print request was prohibited when said processor comprising hardware prohibits the execution.

7. The image forming apparatus according to claim 6, wherein said operation section comprising the liquid crystal display reports a page prohibited to be printed when said processor comprising hardware prohibits the execution of at least a part of the printing based on said print request.

8. The image forming apparatus according to claim 1, further comprising a selection section for selecting a page prohibited to be printed when the execution of at least a part of the printing based on said print request is prohibited.

9. The image forming apparatus according to claim 8, wherein said processor comprising hardware causes said selection section to display a page to be printed based on said print request in preview mode so that said page prohibited to be printed is selected.

10. The image forming apparatus according to claim 1, wherein said processor comprising hardware causes said print section to execute said at least part of the printing prohibited to be executed when the image forming apparatus is not busy, in a case where said processor comprising hardware prohibited the execution of at least a part of the printing based on said print request.

11. The image forming apparatus according to claim 10, wherein said operation section comprising a liquid crystal display further reports that said at least part of the printing was executed by said print section when the image forming apparatus was not busy.

12. A data processing apparatus, comprising:
a reading section for reading a document and generating data regarding the document;
a transmitting/receiving section for transmitting/receiving data;
a print section for printing data; and
a processor comprising hardware for controlling operations of said reading section, said transmitting/receiving section and said print section,
wherein said processor comprising hardware is further configured to:
determine a first timing when printing of a print job associated with a preceding print request is completed;
determine whether a said print request is received;
determine a second timing when said print request is received;
determine a time period between the first timing and the second timing;
determine whether the time period between the first timing and the second timing is less than a predetermined time period;
judge that one of said reading section, said transmitting/receiving section and said print section is busy when the time period between the first timing and the second timing is less than the predetermined time period; and
judge that one of said reading section, said transmitting/receiving section and said print section is not busy when the time period between the first timing and the second timing is not less than the predetermined time period,
wherein said reading section, said transmitting/receiving section and said print section can operate in parallel,
when the print request is received, said processor comprising hardware judges whether or not one of said reading section, said transmitting/receiving section and said print section is busy, and when said processor comprising hardware judges that one of said sections is busy, said processor comprising hardware prohibits an execution of at least a part of printing based on said print request and when one of said sections is not busy, the processor comprising hardware causes the print section to completely execute the printing based on the print request.

13. An image forming method using an image forming apparatus including a print section, comprising:
- accepting a print request via a communication network;
- causing said print section to execute printing based on said print request;
- determining a first timing when printing of a print job associated with a preceding print request is completed;
- determining whether said print request has been accepted;
- determining a second timing when said print request has been accepted;
- determining a time period between the first timing and the second timing;
- determining whether the time period between the first timing and the second timing is less than a predetermined time period;
- judging that said image forming apparatus is busy when the time period between the first timing and the second timing is less than the predetermined time period;
- judging that said image forming apparatus is not busy when the time period between the first timing and the second timing is not less than the predetermined time period;
- prohibiting execution of at least a part of printing based on said print request when it is judged that said image forming apparatus is busy; and
- controlling the print section to completely execute the printing based on said print request when it is judged that said image forming apparatus is not busy.

14. A non-transitory storage medium in which a program is stored so as to be readable by a computer, which when executed by the computer causes the computer to implement a method comprising:
- accepting a print request by an image forming apparatus;
- determining a first timing when printing of a print job associated with a preceding print request is completed;
- determining whether said print request has been accepted;
- determining a second timing when said print request has been accepted;
- determining a time period between the first timing and the second timing;
- determining whether the time period between the first timing and the second timing is less than a predetermined time period;
- judging that the image forming apparatus is busy when the time period between the first timing and the second timing is less than the predetermined time period;
- judging that said image forming apparatus is not busy when the time period between the first timing and the second timing is not less than the predetermined time period;
- prohibiting execution of at least a part of printing based on said print request when it is judged that said image forming apparatus is busy; and
- controlling the print section to completely execute the printing based on said print request when it is judged that said image forming apparatus is not busy.

* * * * *